US006060412A

United States Patent [19]

Ishida

[11] Patent Number: 6,060,412

[45] Date of Patent: May 9, 2000

[54] CRYSTALLINE GLASS, CRYSTALLIZED GLASS, CRYSTALLIZED GLASS ARTICLE, AND PROCESS FOR PRODUCING CRYSTALLIZED GLASS ARTICLE

[75] Inventor: Yuji Ishida, Moriyama, Japan

[73] Assignee: Nippon Electric Glass Co., Ltd., Otsu, Japan

[21] Appl. No.: 09/043,608

[22] PCT Filed: Sep. 25, 1996

[86] PCT No.: PCT/JP96/02752

§ 371 Date: Mar. 20, 1998

§ 102(e) Date: Mar. 20, 1998

[87] PCT Pub. No.: WO97/11921

PCT Pub. Date: Apr. 3, 1997

[30] Foreign Application Priority Data

Sep. 26, 1995 [JP] Japan .................................... 7-273573
Dec. 28, 1995 [JP] Japan .................................... 7-354419
Dec. 28, 1995 [JP] Japan .................................... 7-354421

[51] Int. Cl.[7] ............................ C03C 10/12; C03C 10/14

[52] U.S. Cl. .................................... 501/4; 501/7; 501/68; 65/477; 65/33.7; 65/33.8

[58] Field of Search ...................... 501/4, 7, 68; 65/33.7, 65/33.8, 477

[56] References Cited

U.S. PATENT DOCUMENTS 5,070,045 12/1991 Comte et al. ................................ 501/7
5,173,453 12/1992 Beall et al. ................................ 501/7
5,336,643 8/1994 Goto et al. ................................ 501/7
5,446,008 8/1995 Krolla et al. ................................ 501/7
5,508,235 4/1996 Marker ........................................ 501/7
5,691,256 11/1997 Taguchi et al. ............................ 501/7

FOREIGN PATENT DOCUMENTS 1-308845 12/1989 Japan .

*Primary Examiner*—Karl Group
*Attorney, Agent, or Firm*—Collard & Roe, P.C.

[57] ABSTRACT

In order to provide a crystallized glass which can be shaped by the redraw forming and a method of manufacturing a crystallized glass article by the redraw forming, the crystallized glass contains precipitated crystals with a maximum grain size not greater than 5 $\mu$m and a glass phase at a ratio of 10 to 85 vol %, and has a softening point lower than a melting point of a predominant precipitated crystal, and a property such that crystallization does not progress even when heated at a temperature higher than the softening point. In order to manufacture the crystallized glass article formed by the redrawing, the above-described crystallized glass is preformed and then subjected to the drawing while being heated to a temperature higher than the softening point.

8 Claims, 1 Drawing Sheet

G
11
g
12
12

CRYSTALLINE GLASS, CRYSTALLIZED GLASS, CRYSTALLIZED GLASS ARTICLE, AND PROCESS FOR PRODUCING CRYSTALLIZED GLASS ARTICLE

TECHNICAL FIELD

This invention relates to a crystallizable glass, a crystallized glass, and a crystallized glass article, and to a method of manufacturing the crystallized glass article.

BACKGROUND TECHNIQUE

A crystallized glass is a material containing various crystals precipitated in a glass and exhibiting unique properties which the glass does not have. For example, precipitation of crystals of β-quartz solid solution or β-spodumene solid solution provides a crystallized glass having an extremely low thermal expansion or a negative thermal expansion. Moreover, the crystallized glass generally has a high mechanical strength as compared with the glass because of presence of those crystals.

In recent years, it has been attempted to precisely form the crystallized glass having such excellent properties into the shape of a thin rod, a narrow tube, a thin plate, or the like for application in the field of products, such as electronics parts and precision machine parts, which require precise dimensional accuracy.

As a method of precisely forming the glass, a forming process called redrawing is known. This process comprises the steps of preparing a glass preform with an adequate precision and heating the glass preform to a temperature higher than a softening point of the glass to perform draw forming. This process is widely used in successively producing those glass products which are required to have high precision.

In case of a conventional crystallized glass, however, it is difficult to perform the redraw forming in the manner similar to that for the glass due to the following reasons. Specifically, the conventional crystallized glass has various problems such as difficulty in softening and deformation, difficulty in drawing because of undesirable increase of devitrification during heating, and wide change in physical and chemical properties caused by variation of the amount of crystals dependent on heating. It is therefore proposed to redraw a so-called mother glass, that is, a glass before it is processed into the crystallized glass. However, the glass of this kind is designed to be easily crystallized by heating. Therefore, heating the mother glass for the redraw forming inevitably causes the undesirable devitrification to occur so that not only the dimensions but also the physical and chemical properties are difficult to be controlled.

Under the circumstances, precise forming of the crystallized glass can not presently be achieved by the redraw forming but inevitably requires machining similar to that used for ceramics, resulting in the high cost.

In view of the above-mentioned situation, it is a first object of this invention to provide a crystallizable glass which can be shaped by the redraw forming after crystallization.

It is a second object of this invention to provide a crystallized glass which can be shaped by the redraw forming.

It is a third object of this invention to provide a crystallized glass article obtained by the redraw forming.

It is a fourth object of this invention to provide a method of manufacturing a crystallized glass article by the redraw forming.

DISCLOSURE OF THE INVENTION

As a result of a great deal of studies repeatedly pursued, the present inventor has specified essential requirements which a redrawable crystallized glass must have, based on the knowledge that the crystallized glass is required to have two important conditions, namely, to be easily softened by heating to become drawable and to have a stable crystal phase even when it is heated, so as to be formable by the redrawing.

Specifically, a crystallizable glass according to the present invention has a property of being transformed into a crystallized glass which contains precipitated crystals with a maximum grain size not greater than 5 μm and a glass phase at a ratio of 10 to 85 vol %, and which has a softening point lower than a melting point of a predominant precipitated crystal.

A crystallized glass according to the present invention contains precipitated crystals with a maximum grain size not greater than 5 μm and a glass phase at a ratio of 10 to 85 vol %, and which has a softening point lower than a melting point of a predominant precipitated crystal, and a property such that crystallization does not substantially progress even when heated at a temperature higher than the softening point.

A crystallized glass article according to the present invention is formed by drawing a crystallized glass which contains precipitated crystals with a maximum grain size not greater than 5 μm and a glass phase at a ratio of 10 to 85 vol %, and which has a softening point lower than a melting point of a predominant precipitated crystal, and a property such that crystallization does not substantially progress even when heated at a temperature higher than the softening point.

A method of manufacturing a crystallized glass article according to the present invention comprises the steps of preparing a preform of a crystallizable glass having a property of being transformed into a crystallized glass which contains precipitated crystals with a maximum grain size not greater than 5 μm and a glass phase at a ratio of 10 to 85 vol %, and which has a softening point lower than a melting point of a predominant precipitated crystal, then crystallizing the preform into the crystallized glass, and performing draw forming by heating it to a temperature higher than the softening point.

Another method of manufacturing a crystallized glass according to the present invention comprises the steps of preparing a desired-shaped preform of a crystallized glass which contains precipitated crystals with a maximum grain size not greater than 5 μm and a glass phase at a ratio of 10 to 85 vol %, and which has a softening point lower than a melting point of a predominant precipitated crystal, and a property such that crystallization does not substantially progress even when heated at a temperature higher than the softening point, and performing draw forming by heating the preform to a temperature higher than the softening point.

BEST MODE FOR EMBODYING THE INVENTION

Figure 1:
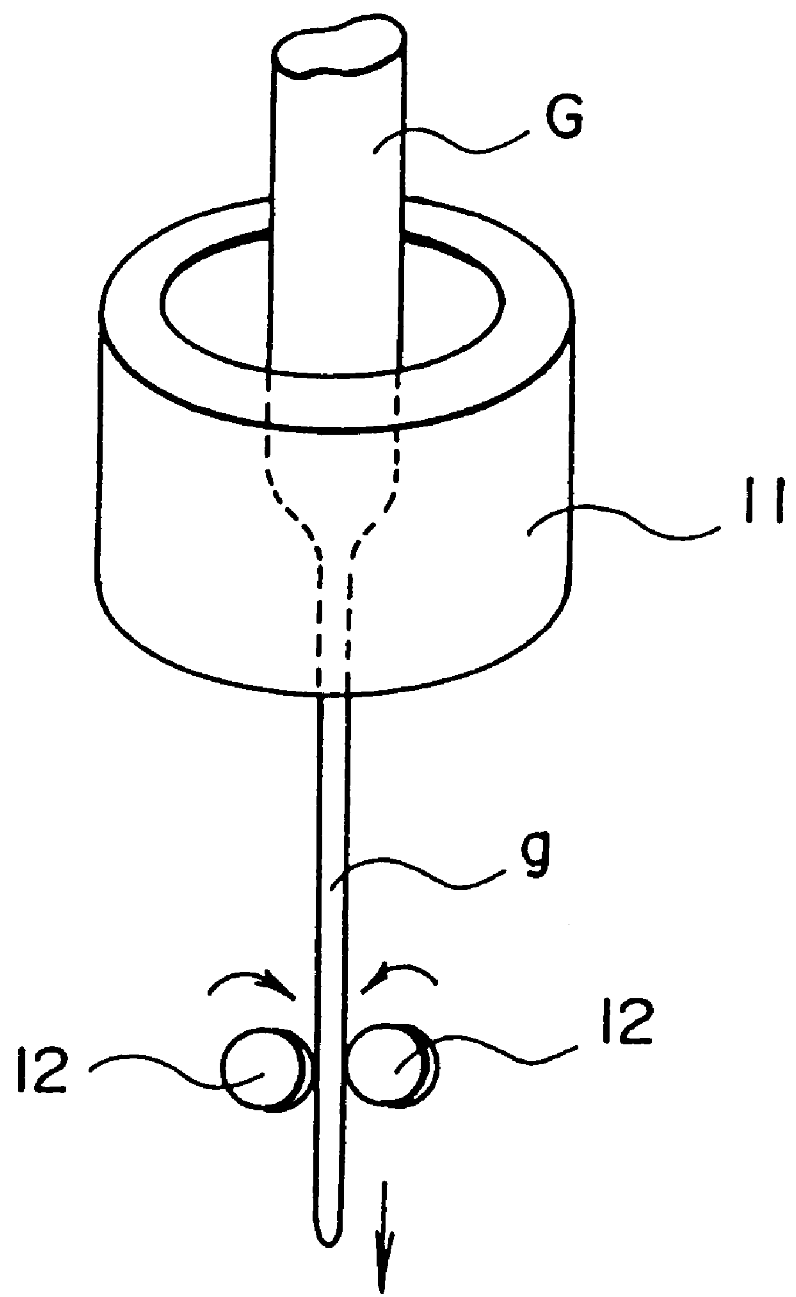
FIG. 1 is a view illustrating the redraw forming.

A crystallizable glass according to the present invention has a property of precipitating, when crystallized, crystals having a maximum grain size not greater than 5 μm, preferably, within the range between 0.02 and 2 μm.

When the maximum grain size of the precipitated crystals exceeds 5 μm, elongation caused by the redraw forming considerably decreases and the crystals protrude from a surface. This results in occurrence of undesirable devitrification and considerably deteriorates the dimensional accuracy and the material properties.

A glass phase ratio after crystallization is 10–85 vol %, preferably, 20–65 vol %. When the glass phase is less than 10 vol %, it is difficult to obtain a softening characteristic sufficient for the redraw forming. When the glass phase is more than 85 vol %, the characteristic as a crystallized glass tends to be deteriorated because the amount of the crystals is decreased.

The crystallizable glass according to the present invention will become, when crystallized, the crystallized glass having a softening point lower than a melting point of the predominant precipitated crystal. When the softening point is lower than the melting point, the redraw forming is applicable at a temperature lower than the melting point. In this event, the crystals still remain after forming so that forming can be carried out with the characteristic as the crystallized glass maintained. The softening point and the crystal melting point of the crystallized glass can be measured by the differential thermal analysis (DTA). A crystallized glass whose softening point can not be detected by the differential thermal analysis is a crystallized glass having a nature such that crystallization progresses by heating or that no softening is caused because of a too small ratio of the glass phase. Such crystallized glass is impossible to be formed by redrawing.

The crystallized glass according to the present invention is produced by crystallizing the crystallizable glass of the above-mentioned property. In addition, the crystallized glass according to the present invention has, as a further important characteristic to enable the redraw forming, a nature such that crystallization does not substantially progress even when heated to a temperature higher than the softening point. In case of the crystallized glass which tends to be readily crystallized, precipitation of coarse crystals (undesirable devitrification) will be concentrated on the surface, because a surface newly produced by the redraw forming has a free energy higher than that of the inside. This results in difficulty of forming and considerable deterioration of dimensional accuracy or material property of a formed product. The above-mentioned nature is not uniquely determined by the characteristic of the crystallizable glass used but also depends upon the conditions of the crystallization. In the present invention, the nature such that crystallization does not substantially progress means that the increase in crystal phase will be smaller than 5 vol %, preferably smaller than 1 vol %, even when reheated and held at a temperature higher than the softening point after being crystallized.

A crystallized glass article according to the present invention is manufactured by the use of the crystallizable glass or the crystallized glass having the above-described characteristics.

As far as the crystallizable glass or the crystallized glass has the above-described characteristics, the precipitated crystals or glass compositions are not specifically limited. The kinds of the precipitated crystals should be selected in dependence upon the purposes and the applications. Following this selection, the glass compositions are determined also. For example, when a low-termal-expansion crystallized glass is required, it is preferred to use a $Li_2O$—$Al_2O_3$—$SiO_2$ crystallizable glass having a property of predominantly precipitating the crystal of β-quartz solid solution or β-spodumene solid solution, or a $Li_2O$—$Al_2O_3$—$SiO_2$ crystallized glass formed by crystallization of the above-mentioned crystallizable glass.

Now, the crystallizable glass and the crystallized glass of the above-mentioned type will be described.

The $Li_2O$—$Al_2O_3$—$SiO_2$ crystallizable or crystallized glass preferably has a composition essentially consisting, by weight percent, of 55–72% (preferably, 62–68.5%) $SiO_2$, 16–30% (preferably, 17–24%) $Al_2O_3$, 1.5–3% (preferably, 1.8–2.8%) $Li_2O$, and 1–10% (preferably, 2.1–7%) $K_2O$.

The ratio of each component is restricted by the following reasons.

$SiO_2$ is a main component of the glass and also a crystal component. When the content of $SiO_2$ is less than 55%, crystallized glass of a uniform structure can not be obtained. On the other hand, the content more than 72% raises the softening point of the crystallized glass and deteriorates the meltability upon melting the glass to result in a nonuniform condition. In this event, partial devitrification easily takes place so that the crystallized glass is considerably decreased in the redraw formability.

$Al_2O_3$ also is a crystal component. The content less than 16% will cause coarse crystals which considerably deteriorate the redraw formability of the crystallized glass. On the other hand, the content more than 30% will cause easy devitrification when the crystallized glass is subjected to the redraw forming.

$Li_2O$ is essential as a crystal component. The content less than 1.5% makes it difficult to obtain a uniform crystallized glass. With the content more than 3%, the crystallizing demand of the glass becomes too strong. As a result, the ratio of the glass phase in the crystallized glass is insufficient and the crystallization easily progresses in the redraw forming process of the crystallized glass.

$K_2O$ is an essential component for controlling the crystallizing demand of the glass and has a serious influence upon the ratio of the glass phase and the softening point of the crystallized glass. Specifically, when the content of $K_2O$ is less than 1%, the crystallizing demand of the glass becomes so strong to make the ratio of the glass phase insufficient and to raise the softening point of the crystallized glass. On the other hand, the content more than 10% makes it difficult to obtain the crystallized glass.

In the above-mentioned composition, it is preferred to contain, in addition to the above-mentioned components, 1–5% (preferably, 1.5–4.5%) $TiO_2$, 0–4% (preferably, 1.5–2.5%) $ZrO_2$, the total amount of $TiO_2$ and $ZrO_2$ being 2–9% (preferably, 3–6%), 0–10% (preferably, 1.5–5%) ZnO, 0–2.5% (preferably, 0–1.5%) MgO, 0–4% (preferably, 0–1%) CaO, 0–6% (preferably, 0–3%) BaO, 0–7% (preferably, 0–4%) $B_2O_3$, 0–4% (preferably, 0–1%) $Na_2O$, and 0–8% (preferably, 0–0.5%) $P_2O_5$. The ratio of each component is restricted by the following reasons.

$TiO_2$ and $ZrO_2$ are nucleation agents upon precipitation of the crystals and serve to minimize the grain size of crystals. When the total amount of the both components is less than 2%, it is difficult to obtain the fine crystals. On the other hand, when the total amount of the both components is more than 9% or when each content exceeds the upper limit of the above-mentioned range, the glass tends to be heterogenous.

Each of ZnO, MgO, CaO, BaO, $B_2O_3$, and $Na_2O$ is a component effective in lowering the softening point of the crystallized glass and can be added within the above-mentioned range. Beyond the above-mentioned range, different kinds of crystals readily precipitate so that the undesirable devitrification occurs.

$P_2O_5$ serves to minimize the grain size of crystals. The content more than 8% results in easy occurrence of undesirable devitrification.

Other components such as $As_2O_3$, $Sb_2O_3$, $SnO_2$, PbO, and $Bi_2O_3$ can also be added within the range not more than 5% in total.

Next, the description will proceed to a method of manufacturing a crystallized glass article according to the present invention by the use of the above-mentioned crystallizable glass.

First of all, the crystallizable glass is shaped into a preform in the shape of a rod, a tube, a plate, or the like, which glass has a property of being transformed into the crystallized glass containing precipitated crystals with a maximum grain size not greater than 5 μm and a glass phase at a ratio of 10–85 vol % and having a softening point lower than a melting point of the predominant precipitated crystal.

The precipitated crystals or the glass compositions of the crystallizable glass are not specifically limited as far as the crystallizable glass can be transformed into the crystallized glass with the above-mentioned characteristics. The kinds of the precipitated crystals should be selected in dependence upon the purposes and the applications. Following this selection, the glass composition are determined also. For example, when a low-expansion crystallized glass is required, it is preferred to use a crystallizable glass having a property of predominantly precipitating β-quartz solid solution or β-spodumene solid solution as a predominant crystal phase. The crystallizable glass of this kind preferably has a composition essentially consisting, by weight percent, of 55–72% $SiO_2$, 14–30% $Al_2O_3$, 1.5–3% $Li_2O$, and 1–10% $K_2O$. In addition, the composition desirably contains 1–5% $TiO_2$, 0–4% $ZrO_2$, 2–9% $TiO_2+ZrO_2$, 0–10% ZnO, 0–2.5% MgO, 0–4% CaO, 0–6% BaO, 0–7% $B_2O_3$, 0–4% $Na_2O$, and 0–8% $P_2O_5$.

Subsequently, the crystallizable glass preform is crystallized. The crystallization is desired to be performed so that the further crystallization does not substantially progress to reheating thereafter. This is because the surface newly produced by the redraw forming has a free energy higher than that of the inside. When the crystallization easily progresses, precipitation of the coarse crystals (undesirable devitrification) will be concentrated on the surface. This results in difficulty of redraw forming and considerable deterioration of dimensional accuracy and material property of the formed product. Herein, "the crystallization does not substantially progress" means that the increase in crystal phase will be smaller than 5 vol %, preferably smaller than 1 vol %, even when reheated and held at a temperature higher than the softening point after the crystallization.

Thereafter, the crystallized glass thus obtained is subjected to draw forming by heating it to a temperature higher than the softening point, and then cut in a desired length. In this manner, the crystallized glass article formed by the redrawing in the shape of a thin rod, a narrow tube, or a thin plate can be obtained.

The step of crystallization of the crystallizable glass and the subsequent step of the draw forming may be independently carried out, or continuously carried out in a single step by appropriate adjustment of a temperature schedule.

Now, description will proceed to a method of manufacturing a crystallized glass article according to the present invention by the use of the above-mentioned crystallized glass.

First of all, the crystallized glass is shaped into a preform in the shape of a rod, a tube, a plate, or the like, which contains precipitated crystals with a maximum grain size not greater than 5 μm and a glass phase at a ratio of 10 to 85 vol %, and which has a softening point lower than a melting point of the predominant precipitated crystal, and a property such that crystallization does not substantially progress even when heated at the temperature higher than the softening point.

The precipitated crystals or the glass compositions of the crystallized glass are not specifically limited as far as the crystallized glass has the above-mentioned characteristics. The kinds of the precipitated crystals should be selected in dependence upon the purposes and the applications. Following this selection, the glass composition is also determined. For example, when a low-expansion crystallized glass is required, it is preferred to use a crystallized glass having a property of predominantly precipitating β-quartz solid solution or β-spodumene solid solution as a predominant crystal phase.

The crystallized glass of this kind preferably has a composition essentially consisting, by weight percent, of 55–72% $SiO_2$, 14–30% $Al_2O_3$, 1.5–3% $Li_2O$, and 1–10% $K_2O$. In addition, the composition desirably contains 1–5% $TiO_2$, 0–4% $ZrO_2$, 2–9% $TiO_2+ZrO_2$, 0–10% ZnO, 0–2.5% MgO, 0–4% CaO, 0–6% BaO, 0–7% $B_2O_3$, 0–4% $Na_2O$, and 0–8% $P_2O_5$.

Thereafter, the crystallized glass preform is heated to a temperature higher than the softening point to be formed by drawing, and then cut in a desired length. In this manner, the crystallized glass article is formed in the shape of a thin rod, a narrow tube, or a thin plate can be obtained by redraw forming.

Next, description will be made in detail as regards examples of manufacturing the glass according to the present invention.

Table 1 and Table 2 show samples Nos. 1–6 according to the present invention and comparative samples Nos. 7–9.

Each of the samples Nos. 1–3 of the present invention was manufactured in the manner described in the following. At first, a batch of glass materials was prepared to have a composition illustrated in Table and fed into a glass melt furnace. The batch was melted at 1650° C. for 24 hours and then cast into a cylindrical shape having a diameter of 50 mm and a length of 500 mm. Subsequently, by the use of the diamond tool, the periphery of the crystallizable glass was ground to improve the roundness. Thus, a preform having a diameter of 40 mm was obtained. Thereafter, the preform was heated in an electric furnace for crystallization. The crystallization was carried out for 4 hours at each of the nucleation temperature and the crystal growth temperature which are shown in Table 1 and Table 2.

Each of the samples Nos. 4–6 of this invention and the comparative samples Nos. 7–9 was manufactured in the manner described in the following. At first, the crystallizable glass was formed into a cylindrical shape having a diameter of 50 mm and a length of 500 mm in the manner similar to that described in the foregoing. Subsequently, the crystallizable glass was heated in the electric furnace for crystallization. Thereafter, by the use of the diamond tool, the periphery of the crystallized glass was ground to improve the roundness. Thus, a preform having a diameter of 40 mm, was obtained.

The crystallized glass preform thus obtained was subjected to measurement of the types and the maximum grain sizes of precipitated crystals, the ratio of a glass phase, a melting point of a predominant crystal, and a softening point of the crystallized glass. In addition, after heating for one hour at the temperature which is 70° C. higher than the softening point or 50–150° C. lower than the melting point of the predominant crystal, the ratio of the glass phase was again measured. The measured data are shown in Table 3 and Table 4.

Referring to FIG. 1, the preform G was continuously fed into an annular electric furnace 11 from the above with a rate of 5 mm/min. At this time, the lower end of the preform which is softened and deformed to extend downward is pressed between rollers 12 to be drawn into a thin rod having a diameter of 2.5 mm at a rate of 1280 mm/min. The formability in this process was evaluated. In FIG. 1, a reference symbol g represents the crystallized glass which has been drawn. The redraw forming was carried out at the temperatures shown in Table 3 and Table 4. The results of the evaluation on the respective samples are shown in Table 3 and Table 4.

TABLE 1

| | EXAMPLE NO. | | | | |
|---|---|---|---|---|---|
| | 1 | 2 | 3 | 4 | 5 |
| GLASS COMPOSITION (wt %) | | | | | |
| $SiO_2$ | 58.8 | 66.3 | 67.4 | 64.3 | 65.9 |
| $Al_2O_3$ | 24.5 | 18.2 | 16.6 | 18.0 | 18.2 |
| $Li_2O$ | 2.8 | 2.3 | 2.3 | 2.5 | 2.0 |
| $K_2O$ | 7.0 | 3.4 | 3.5 | 5.0 | 3.4 |
| $TiO_2$ | 2.8 | 1.8 | 3.0 | 3.0 | 1.5 |
| $ZrO_2$ | 3.2 | 1.8 | 1.8 | 2.0 | 1.8 |
| ZnO | — | 3.1 | 2.0 | 3.1 | 3.6 |
| MgO | — | 1.0 | 1.0 | 1.0 | 1.5 |
| CaO | — | — | — | 0.4 | 0.6 |
| BaO | — | — | — | 0.5 | 1.4 |
| $B_2O_3$ | — | — | 2.0 | — | — |
| $Na_2O$ | 0.4 | — | — | — | — |
| $P_2O_5$ | — | — | 0.4 | — | — |
| $As_2O_3$ | 0.5 | — | — | 0.2 | 0.1 |
| $Bi_2O_3$ | — | 2.1 | — | — | — |
| CRYSTALLIZING CONDITION(° C.) | | | | | |
| NUCLEATION TEMPERATURE | 780 | 780 | 790 | 780 | 780 |
| CRYSTAL GROWTH TEMPERATURE | 1000 | 1000 | 980 | 1050 | 1000 |

TABLE 2

| | EXAMPLE NO. | | | |
|---|---|---|---|---|
| | 6 | 7 | 8 | 9 |
| GLASS COMPOSITION (wt %) | | | | |
| $SiO_2$ | 57.8 | 65.5 | 65.5 | 69.9 |
| $Al_2O_3$ | 24.6 | 22.3 | 22.3 | 13.2 |
| $Li_2O$ | 2.7 | 4.0 | 4.0 | 2.4 |
| $K_2O$ | 7.0 | 0.3 | 0.3 | 3.6 |
| $TiO_2$ | 2.8 | 2.2 | 2.2 | 1.8 |
| $ZrO_2$ | 3.2 | 2.0 | 2.0 | 1.8 |
| ZnO | 1.0 | — | — | 3.2 |
| MgO | — | 1.0 | 1.0 | 1.2 |
| CaO | — | — | — | 0.8 |
| BaO | — | — | — | 1.7 |
| $B_2O_3$ | — | — | — | — |
| $Na_2O$ | 0.4 | 0.5 | 0.5 | — |
| $P_2O_5$ | — | 1.7 | 1.7 | 0.4 |
| $As_2O_3$ | 0.5 | 0.5 | 0.5 | — |
| $Bi_2O_3$ | — | — | — | — |
| CRYSTALLIZING CONDITION(° C.) | | | | |
| NUCLEATION TEMPERATURE | 780 | 790 | 790 | 780 |
| CRYSTAL GROWTH TEMPERATURE | 1000 | 880 | 1000 | 1050 |

TABLE 3

| | SAMPLE NO. | | | | |
|---|---|---|---|---|---|
| | 1 | 2 | 3 | 4 | 5 |
| RATIO OF GLASS PHASE | | | | | |
| BEFORE HEATED (vol %) | 65 | 40 | 30 | 35 | 30 |
| AFTER HEATED (vol %) | 85 | 50 | 35 | 60 | 40 |
| PREDOMINANT PRECIPITATED CRYSTAL | β-quartz solid solution | β-spodumene solid solution | β-spodumene solid solution | β-spodumene solid solution | β-spodumene solid solution |
| MAXIMUM CRYSTAL GRAIN SIZE (μm) | 0.1 | 1.0 | 2.5 | 0.3 | 0.5 |
| MELTING POINT | 1150 | 1200 | 1200 | 1170 | 1200 |

TABLE 3-continued

| | SAMPLE NO. | | | | |
|---|---|---|---|---|---|
| | 1 | 2 | 3 | 4 | 5 |
| OF PREDOMINANT PRECIPITATED CRYSTAL (° C.) | | | | | |
| SOFTENING POINT (° C.) | 1010 | 1080 | 1070 | 1050 | 1080 |
| REDRAW FORMABILITY | | | | | |
| HEATING TEMPERATURE (° C.) | 1080 | 1150 | 1140 | 1120 | 1150 |
| ELONGATION | good | good | good | good | good |
| PRESENCE OF DEVITRIFIED PORTIONS | no | no | no | no | no |

TABLE 4

| | SAMPLE NO. | | | |
|---|---|---|---|---|
| | 6 | 7 | 8 | 9 |
| RATIO OF GLASS PHASE | | | | |
| BEFORE HEATED (vol %) | 65 | 30 | 3 | 30 |
| AFTER HEATED (vol %) | 85 | 5 | 3 | 25 |
| PREDOMINANT PRECIPITATED CRYSTAL | β-quartz solid solution | β-quartz solid solution | β-spodumene solid solution | β-spodumene solid solution |
| MAXIMUM CRYSTAL GRAIN SIZE (μm) | 0.2 | 0.05 | 1.5 | 15.0 |
| MELTING POINT OF PREDOMINANT PRECIPITATED CRYSTAL (° C.) | 1140 | 1300 | 1300 | 1200 |
| SOFTENING POINT (° C.) | 1000 | unmeasurable | unmeasurable | 1080 |
| REDRAW FORMABILITY | | | | |
| HEATING TEMPERATURE (° C.) | 1080 | 1150 | 1250 | 1150 |
| ELONGATION | good | no good | no good | no good |
| PRESENCE OF DEVITRIFIED PORTIONS | no | yes | no | yes |

As is apparent from Tables, each of the samples Nos. 1–6 of the present invention contained precipitated crystals with a maximum grain size not greater than 2.5 μm and a glass phase at a ratio of 20–65 vol %. In addition, each of the samples Nos. 1–6 of the present invention had a softening point lower than the melting point of the predominant precipitated crystal. After heating, the glass phase was increased by 5–25 vol %. This means that the crystallization did not progress at all. In evaluation for the redraw formability, all of these samples exhibited excellent formability.

On the other hand, when the comparative sample No. 7 was heated, the ratio of the glass phase decreased by 25 vol %. This shows that the crystallization progressed extremely. The softening point could not be measured because the crystallization extremely progressed when heated. This sample was evaluated for the formability. As a result, the glass was broken during the drawing process and a large number of devitrified portions were observed on the surface.

For the comparative sample No. 8, the softening point could not be measured because of the extremely small ratio of the glass phase. In evaluation of the formability of this sample, drawing was impossible because of insufficient softening and deformation.

The comparative sample No. 9 contained coarse crystal particles. In evaluation of the formability, the glass was broken during the drawing process. In addition, undesirable devitrification was remarkable.

The type of the predominant precipitated crystal was identified by the use of the X-ray diffraction analysis (XRD). The maximum grain size of the precipitated crystal and the ratio of the glass phase were measured by a scanning electron microscope (SEM). The melting point of the predominant precipitated crystal and the softening point of the crystallized glass were measured by a differential thermal analysis (DTA) for those samples in the form of powder not greater than 150 mesh. The redraw formability (the elongation and presence of the undesirable devitrification) was evaluated in the following manner.

In absence of breakage of the glass during the redraw forming, the elongation is indicated good. On the other hand, when the interruption was caused or no elongation was observed, the elongation is indicated no good. As for the devitrified portions, the surface of each sample after the forming process was visually observed. The samples are labelled no and yes when the undesirably devitrified portions were not observed and were observed, respectively.

As described above, the crystallizable glass of this invention is crystallized into the crystallized glass which can be shaped by the redraw forming.

The crystallized glass according to the present invention does not require the machining process similar to that used for ceramics because the redraw forming is possible. Therefore, it is possible to provide the formed articles with high precision at low cost.

The crystallized glass article according to the present invention is high in the dimensional accuracy and can be provided at low cost. Such article is suitable for use as electronics parts, precision machine parts, and the like.

Moreover, according to the method of the present invention, it is possible to provide the crystallized glass article with high dimensional accuracy at low cost. This method is therefore suitable for use in manufacturing the crystallized glass which is used as the electronics parts, precision machine parts, or the like.

Industrial Applicability

As described above, the crystallizable glass according to the present invention can produce the crystallized glass which can be shaped by the redraw forming. The crystallized glass article manufactured by the use of the crystallized glass is suitable as the electronics parts, precision machine parts, or the like.

What is claimed is:

1. A method of manufacturing a crystallized glass article, comprising the steps of preparing a preform of a crystallizable glass having a composition consisting essentially of, by weight, 55–72% $SiO_2$, 16–30% $Al_2O_3$, 1.5–3% $Li_2O$, 1–10% $K_2O$, 1–5% $TiO_2$, 0–4% $ZrO_2$, 2–9% $TiO_2$+$ZrO_2$, 0–10% ZnO, 0–2.5% MgO, 0–4% CaO, 0–6% BaO, 0–7% $B_2O_3$, 0–4% $Na_2O$, and 0–8% $P_2O_5$, which has a property of being transformed into a crystallized glass which contains precipitated crystals with a maximum grain size not greater than 5 $\mu$m and a glass phase at a ratio of 10 to 85 vol %, and which has a softening point lower than a melting point of a predominant precipitated crystal, then crystallizing and performing draw forming by heating it to a temperature higher than the softening point.

2. A method of manufacturing a crystallized glass article as claimed in claim 1, wherein the predominant precipitated crystal is β-quartz solid solution or β-spodumene solid solution.

3. A method of manufacturing a crystallized glass article comprising the steps of preparing a preform of a crystallized glass having a composition consisting essentially of, by weight, 55–72% $SiO_2$, 16–30% $Al_2O_3$, 1.5–3% $Li_2O$, 1–10% $K_2O$, 1–5% $TiO_2$, 0–4% $ZrO_2$, 2–9% $TiO_2$+$ZrO_2$, 0–10% ZnO, 0–2.5% MgO, 0–4% CaO, 0–6% BaO, 0–7% $B_2O_3$, 0–4% $Na_2O$, and 0–8% $P_2O_5$, which contains precipitated crystals with a maximum grain size not greater than 5 $\mu$m and a glass phase at a ratio of 10 to 85 vol %, and which has a softening point lower than a melting point of a predominant precipitated crystal, and a property such that crystallization does not substantially progress even when heated at a temperature higher than the softening point, and performing draw forming by heating it to a temperature higher than the softening point.

4. A method of manufacturing a crystallized glass article as claimed in claim 3, wherein the predominant precipitated crystal is β-quartz solid solution or β-spodumene solid solution.

5. A crystallized glass having a composition consisting essentially of, by weight, 55–72% $SiO_2$, 16–30% $Al_2O_3$, 1.5–3% $Li_2O$, 1–10% $K_2O$, 1–5% $TiO_2$, 0–4% $ZrO_2$, 2–9% $TiO_2$+$ZrO_2$, 0–10% ZnO, 0–2.5% MgO, 0–4% CaO, 0–6% BaO, 0–7% $B_2O_3$, 0–4% $Na_2O$, and 0–8% $P_2O_5$, and containing precipitated crystals, said precipitated crystals having a maximum grain size not greater than 5 micrometers, and a glass phase at a rate of 10 to 85 vol %, said crystallized glass having a softening point lower than a melting point of a predominant precipitated crystal and also having a property such that crystallization does not substantially progress even when heated at a temperature higher than the softening point.

6. A crystallized glass as claimed in claim 5, wherein the predominant precipitated crystal is β-quartz solid solution or β-spodumene solid solution.

7. A crystallized glass article formed by drawing a crystallized glass having a composition consisting essentially of, by weight, 55–72% $SiO_2$, 16–30% $Al_2O_3$, 1.5–3% $Li_2O$, 1–10% $K_2O$, 1–5% $TiO_2$, 0–4% $ZrO_2$, 2–9% $TiO_2$+$ZrO_2$, 0–10% ZnO, 0–2.5% MgO, 0–4% CaO, 0–6% BaO, 0–7% $B_2O_3$, 0–4% $Na_2O$, and 0–8% $P_2O_5$, and said glass containing precipitated crystals with a maximum grain size not greater than 5 $\mu$m and a glass phase at a ratio of 10 to 85 vol %, said crystallized glass also having a softening point lower than a melting point of a predominant precipitated crystal, and a property such that crystallization does not substantially progress even when heated at a temperature higher than the softening point.

8. A crystallized glass article as claimed in claim 7, wherein the predominant precipitated crystal is β-quartz solid solution or β-spodumene solid solution.

* * * * *